(12) United States Patent
Chuang et al.

(10) Patent No.: US 9,531,853 B2
(45) Date of Patent: Dec. 27, 2016

(54) ELECTRONIC MODULE AND ELECTRONIC DEVICE

(71) Applicant: HTC Corporation, Taoyuan County (TW)

(72) Inventors: I-Cheng Chuang, Taoyuan County (TW); Yu-Jing Liao, Taoyuan County (TW); Ying-Yen Cheng, Taoyuan County (TW); Chih-Wei Tu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 386 days.

(21) Appl. No.: 14/069,392

(22) Filed: Nov. 1, 2013

(65) Prior Publication Data
US 2014/0268585 A1 Sep. 18, 2014

Related U.S. Application Data

(60) Provisional application No. 61/781,027, filed on Mar. 14, 2013.

(51) Int. Cl.
*H05K 7/00* (2006.01)
*H04M 1/02* (2006.01)

(52) U.S. Cl.
CPC .................. *H04M 1/0266* (2013.01)

(58) Field of Classification Search
CPC .. H05K 9/0032; H05K 9/0039; H05K 9/0016; H05K 9/0062; H05K 1/0218; G06F 1/182
(Continued)

(56) References Cited

U.S. PATENT DOCUMENTS 4,720,606 A * 1/1988 Senn ................. H05K 9/0015
174/356
5,008,485 A * 4/1991 Kitagawa ........... H05K 9/0015
174/356
(Continued)

FOREIGN PATENT DOCUMENTS

| CN | 1755454 | 4/2006 |
| CN | 201294509 | 8/2009 |
| WO | 2011132473 | 10/2011 |

OTHER PUBLICATIONS

"Office Action of Taiwan Counterpart Application", issued on Nov. 30, 2015, p. 1-p. 8.

*Primary Examiner* — Hung S Bui
(74) *Attorney, Agent, or Firm* — Jianq Chyun IP Office

(57) ABSTRACT

An electronic device including a rear cover, a transparent front cover, a first electronic element, a second electronic element, a conductive tape, and an elastomer is provided. The transparent front cover is disposed on the rear cover. The first electronic element is disposed between the transparent front cover and the rear cover. The second electronic element is disposed between the first electronic element and the rear cover. The conductive tape is disposed between the first electronic element and the second electronic element, and contacts the first electronic element and the second electronic element to electrically connect the first electronic element to the second electronic element. The elastomer is disposed between the first electronic element and the second electronic element, and is attached to the conductive tape under pressure. An electronic module including the first electronic element, the second electronic element, the conductive tape, and the elastomer above is provided.

16 Claims, 1 Drawing Sheet

(58) Field of Classification Search
USPC ........ 361/799, 816, 818; 174/354, 356, 358, 174/363
See application file for complete search history.

(56) References Cited

U.S. PATENT DOCUMENTS

| | | | | |
|---|---|---|---|---|
| 5,045,635 | A * | 9/1991 | Kaplo | H02B 1/16 |
| | | | | 174/354 |
| 5,804,762 | A * | 9/1998 | Jones | H05K 9/0015 |
| | | | | 174/358 |
| 6,255,581 | B1 * | 7/2001 | Reis | H05K 3/4015 |
| | | | | 174/363 |
| 6,943,288 | B1 * | 9/2005 | Miska | H05K 9/0015 |
| | | | | 174/388 |
| 7,732,714 | B2 * | 6/2010 | Hammaker | F16J 15/027 |
| | | | | 174/356 |
| 7,931,475 | B2 * | 4/2011 | Kim | H01R 12/57 |
| | | | | 439/66 |
| 8,461,455 | B2 * | 6/2013 | Kim | H01R 13/2414 |
| | | | | 174/126.2 |
| 8,481,867 | B2 * | 7/2013 | Book | H05K 9/0016 |
| | | | | 174/355 |
| 8,884,168 | B2 * | 11/2014 | Cook | H05K 9/0015 |
| | | | | 174/356 |
| 9,078,351 | B2 * | 7/2015 | Matano | H05K 1/0213 |
| 2009/0059550 | A1 * | 3/2009 | Miyamura | H05K 9/0096 |
| | | | | 361/816 |
| 2010/0090921 | A1 | 4/2010 | Kim et al. | |
| 2011/0155445 | A1 * | 6/2011 | Kwon | H04B 15/04 |
| | | | | 174/384 |

* cited by examiner

ELECTRONIC MODULE AND ELECTRONIC DEVICE

CROSS-REFERENCE TO RELATED APPLICATION

This application claims the priority benefits of U.S. provisional application Ser. No. 61/781,027, filed on Mar. 14, 2013. The entirety of the above-mentioned patent application is hereby incorporated by reference herein and made a part of this specification.

BACKGROUND OF THE INVENTION

Field of Invention

The application relates to an electronics module and an electronic device which have electrically conductive interface.

Description of Related Art

With the advancement of the technology, smart phones and tablet computers have become mainstreams of consumer electronics products. For the smart phones, for example, in addition to electrical performances and screen size thereof, the body thickness thereof is also a concern to the consumers. In order to meet the demands of the consumer, producers of the smart phones have been continued to reduce the body thicknesses of the smart phones. However, the reducing of the body thicknesses is not without limit. Therefore, how to further reduce the body thickness under the existing framework is becoming the focus of research and development.

FIG. 1 is a cross-sectional view of the conventional smart phone. Please refer to FIG. 1. A smart phone 10 includes a display module 12 and a chassis 14. A conductive pad 16 which is made of a conductive rubber is used as an interface for grounding between the display module 12 and the chassis 14. However, since a thickness of the conductive pad 16 has to be larger than 0.2 mm, thinning of the smart phone 10 is impeded.

SUMMARY OF THE INVENTION

The application is to provide an electronic module, which is suitable for an electronic device to reduce the overall thickness of the electronic device.

The application is to provide an electronic device, which has a small overall thickness.

The electronic module of the application includes a first electronic element, a second electronic element, a conductive tape, and an elastomer. The conductive tape is disposed between the first electronic element and the second electronic element and contacts the first electronic element and the second electronic element to electrically connect the first electronic element to the second electronic element. The elastomer is disposed between the first electronic element and the second electronic element, and is attached to the conductive tape under pressure.

The electronic device of the application includes a rear cover, a transparent front cover, a first electronic element, a second electronic element, a conductive tape, and an elastomer. The transparent front cover is disposed on the rear cover. The first electronic element is disposed between the transparent front cover and the rear cover. The second electronic element is disposed between the first electronic element and the rear cover. The conductive tape is disposed between the first electronic element and the second electronic element and contacts the first electronic element and the second electronic element to electrically connect the first electronic element to the second electronic element. The elastomer is disposed between the first electronic element and the second electronic element, and is attached to the conductive tape under pressure.

According to the above, the application replaces conventional conductive pads with a combination of the conductive tape and the elastomer as a conductive interface between two electronic elements of the electronic device, thereby reducing the thickness of the electronic device.

In order to make the aforementioned and other features and advantages of the application comprehensible, embodiments accompanied with figures are described in detail below.

DESCRIPTION OF EMBODIMENTS

Figure 2:
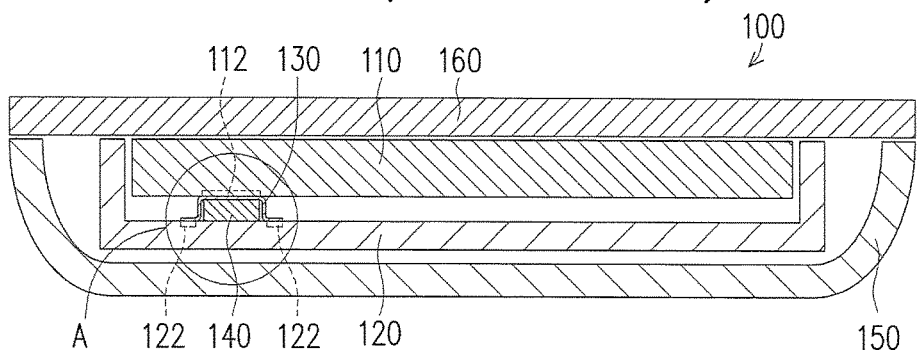
FIG. 2 is a cross-sectional view of the electronic device according to an embodiment of the application.
Figure 3:
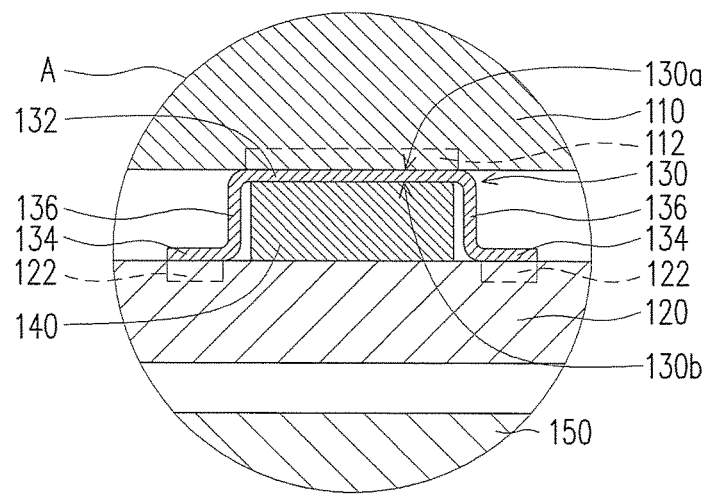
FIG. 3 is an enlarged view of a portion A of FIG. 2.

FIG. 2 is a cross-sectional view of the electronic device according to an embodiment of the application, and FIG. 3 is an enlarged view of a portion A of FIG. 2. Please refer to FIG. 2 and FIG. 3, a electronic device 100 of the embodiment is such as a smart phone. In another embodiment not illustrated, the electronic device 100 may also be a tablet computer, etc. The electronic device 100 includes a first electronic element 110 and a second electronic element 120. In the present embodiment, the first electronic element 110 is such as liquid crystal module (LCM) and the second electronic element 120 is such as a chassis, wherein the second electronic element 120 is grounded, but the application is not limited thereto. In another embodiment not illustrated, the first electronic element 110 and the second electronic element 120 are such as antenna and elements that are electrically contacted to the antennas.

In order to electrically connect the first electronic element 110 to the second electronic element 120, the electronic device 100 includes a conductive tape 130 and an elastomer 140. The conductive tape 130 is disposed between the first electronic element 110 and the second electronic element 120, and the conductive tape 130 contacts a first contact point 112 and a second contact point 122, so as to electrically connect the first contact point 112 to the second contact point 122. An elastomer 140 is disposed between the conductive tape 130 and the second electronic element 120, and the elastomer 140 is attached to the conductive tape 130 under pressure, so as to pressure on the conductive tape 130 with respect to the second electronic element 120, thereby ensuring that the conductive tape 130 contacts the first contact point 112. In the present embodiment, the first electronic element 110, the second electronic element 120, the conductive tape 130, and the elastomer 140 above constitute an electronic module.

In the present embodiment, the conductive tape 130 is a cloth material with conductivity, which is made by coating the conductive material on the surface of the special cloth. The conductive tape 130 has conductivity, a thinner thickness and better bendability simultaneously, and the conductive tape 130 has two opposing surfaces 130a and 130b, wherein the two surfaces 130a and 130b are electrically connected to each other. The first electronic element 110 may have a first contact point 112, and the second electronic element 120 may have one or more second contact points 122. The conductive tape 130 has a first contact portion 132, one or more second contact portions 134, and one or more extending portions 136. The first contact portion 132 is located between the first contact point 112 and the elastomer 140, the second contact portion 134 adheres to the second contact point 122 through a conductive adhesive, and the extending portion 136 connects the first contact portion 132 and the corresponding second contact portion 134.

In the present embodiment, a projection on the second electronic element 120 of a contact region between the conductive tape 130 and the first electronic element 110 does not overlap a projection on the second electronic element 120 of a contact region between the conductive tape 130 and the second electronic element 120. In other words, a projection of the first contact point 112 on the second electronic element 120 may not overlap the second contact point 122, and a projection of the second contact point 122 on the first electronic element 110 may not overlap the second contact point 112.

In the present embodiment, the elastomer 140 may be a sponge or other non-conductive elastic materials. In the present embodiment, the elastomer 140 may adhere to the second electronic element 120 through an adhesive, so as to fix the position of the elastomer 140 relative to the conductive tape 130, especially the position of the first contact portion 132 of the conductive tape 130.

Please refer to FIG. 2 again. The electronic device 100 further includes a rear cover 150 and a transparent front cover 160 which is disposed on the rear cover 150. The first electronic element 110 is disposed between the transparent front cover 160 and the rear cover 150, and the second electronic element 120 is disposed between the first electronic element 110 and rear cover 150. When the first electronic element 110 is the liquid crystal module, the image generated by the first electronic element 110 may be displayed through the transparent front cover 160.

Figure 1:
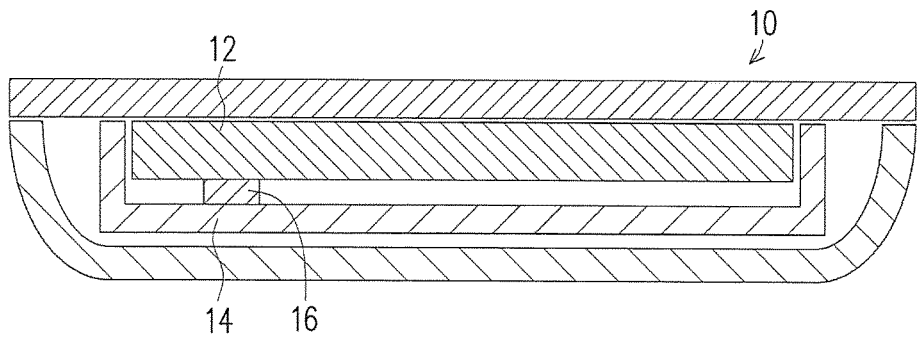
FIG. 1 is a cross-sectional view of the conventional smart phone.

It should be noted that, a thickness of the conventional conductive pad 16 illustrated in FIG. 1 which is made of conductive rubber has to be larger than 0.2 mm. Relative to the conventional conductive pad 16, an overall thickness of the conductive tape 130 and the elastomer 140 of the embodiment illustrated in FIG. 2 may be less than 0.2 mm, which facilitates thinning of the electronic device.

In summary, although the conventional conductive rubber pad has the conductivity and the elasticity simultaneously, the thickness thereof is larger. However, in the application, the conductivity is provided by the conductive tape and the elasticity is provided by the elastomer, thereby the thickness of the stacked conductive tape and the elastomer is smaller. Accordingly, in the current situation that the thicknesses of the electronic devices such as the smart phone and the tablet computer, etc. have been reduced to the limit, the application may still replace the conventional conductive rubber pads or metal strips with the combination of the conductive tape and the elastomer as the conductive interface (such as the conductive interface for grounding) between the two electronic elements of the electronic device, thereby reducing the thickness of the electronic device.

The application has been disclosed above in the preferred embodiments, but is not limited to those. It is known to persons skilled in the art that some modifications and innovations may be made without departing from the spirit and scope of the application. Therefore, the scope of the application should be defined by the following claims.

What is claimed is:

1. An electronic module, comprising:
   a first electronic element;
   a second electronic element;
   a conductive tape disposed between the first electronic element and the second electronic element, and contacting the first electronic element and the second electronic element to electrically connect the first electronic element to the second electronic element; and
   an elastomer disposed between the first electronic element and the second electronic element, and attached to the conductive tape under pressure,
   wherein the conductive tape has an extending portion, and the extending portion and a side face of the elastomer have a gap therebetween,
   wherein the conductive tape is a cloth material with conductivity, and
   wherein a projection on the second electronic element of a contact region between the conductive tape and the first electronic element does not overlap a projection on the second electronic element of a contact region between the conductive tape and the second electronic element.

2. The electronic module as claimed in claim 1, wherein the first electronic element is a display module of an electronic device, and the second electronic element is a chassis of the electronic device.

3. The electronic module as claimed in claim 1, wherein the first electronic element has a first contact point, the second electronic element has a second contact point, the conductive tape further has a first contact portion and a second contact portion, the first contact portion is located between the first contact point and the elastomer, the second contact portion adheres to the second contact point through a conductive adhesive, and the extending portion connects the first contact portion and the second contact portion.

4. The electronic module as claimed in claim 1, wherein the elastomer is a sponge.

5. The electronic module as claimed in claim 1, wherein the elastomer adheres to the second electronic element through an adhesive.

6. The electronic module as claimed in claim 1, wherein the elastomer pressures on the conductive tape with respect to the second electronic element to ensure that the conductive tape contacts the first electronic element.

7. The electronic module as claimed in claim 1, wherein the second electronic element is grounded.

8. The electronic module as claimed in claim 1, wherein the conductive tape has two opposing surfaces, and the two surfaces are electrically connected to each other.

9. An electronic device, comprising:
   a rear cover;
   a transparent front cover disposed on the rear cover;
   a first electronic element disposed between the transparent front cover and the rear cover;
   a second electronic element disposed between the first electronic element and the rear cover;
   a conductive tape disposed between the first electronic element and the second electronic element, and contacting the first electronic element and the second electronic element to electrically connect the first electronic element to the second electronic element; and
   an elastomer disposed between the first electronic element and the second electronic element, and attached to the conductive tape under pressure, wherein the conductive tape has an extending portion, and the extending portion and a side face of the elastomer have a gap therebetween, wherein the conductive tape is a cloth material with conductivity, and wherein a projection on the second electronic element of a contact region between the conductive tape and the first electronic element does not overlap a projection on the second electronic element of a contact region between the conductive tape and the second electronic element.

10. The electronic device as claimed in claim 9, wherein the first electronic element is a display module, and the second electronic element is a chassis.

11. The electronic device as claimed in claim 9, wherein the first electronic element has a first contact point, the second electronic element has a second contact point, the conductive tape further has a first contact portion and a second contact portion, the first contact portion is located between the first contact point and the elastomer, the second contact portion adheres to the second contact point through a conductive adhesive, and the extending portion connects the first contact portion and the second contact portion.

12. The electronic device as claimed in claim 9, wherein the elastomer is a sponge.

13. The electronic device as claimed in claim 9, wherein the elastomer adheres to the second electronic element through an adhesive.

14. The electronic device as claimed in claim 9, wherein the elastomer pressures on the conductive tape with respect to the second electronic element to ensure that the conductive tape contacts the first electronic element.

15. The electronic device as claimed in claim 9, wherein the second electronic element is grounded.

16. The electronic device as claimed in claim 9, wherein the conductive tape has two opposing surfaces, and the two surfaces are electrically connected to each other.

* * * * *